(12) United States Patent
Kratzmaier (10) Patent No.: US 7,316,382 B2
(45) Date of Patent: Jan. 8, 2008

(54) CONTROLLING ELECTROMOTIVE ACTUATORS

(75) Inventor: Erich Kratzmaier, Eurasburg (DE)

(73) Assignee: Kratzmaier Konstruktionen GmbH, Eurasburg (DE)

( * ) Notice: Subject to any disclaimer, the term of this patent is extended or adjusted under 35 U.S.C. 154(b) by 781 days.

(21) Appl. No.: 10/856,134

(22) Filed: May 28, 2004

(65) Prior Publication Data

US 2004/0245958 A1    Dec. 9, 2004

(30) Foreign Application Priority Data

May 30, 2003   (EP)   ................................. 03012402

(51) Int. Cl.
   *F16K 31/04*   (2006.01)
   *A61B 18/20*   (2006.01)

(52) U.S. Cl. ........................ 251/129.01; 251/129.15; 251/129.2; 318/561; 318/599; 606/10

(58) Field of Classification Search ........... 251/129.01, 251/129.02, 129.15, 129.2; 318/561, 580, 318/599, 600, 615; 606/10
See application file for complete search history.

(56) References Cited

U.S. PATENT DOCUMENTS

| 4,300,611 | A | 11/1981 | Silverman |
| 4,311,945 | A | 1/1982 | Aoyama |
| 4,845,416 | A | 7/1989 | Scholl et al. |
| 5,218,895 | A * | 6/1993 | Lukich et al. ................. 91/361 |
| 6,565,064 | B2 * | 5/2003 | Smith et al. ........... 251/129.04 |
| 6,612,331 | B2 * | 9/2003 | Cederstav et al. ....... 137/487.5 |
| 7,166,981 | B2 * | 1/2007 | Kakutani et al. ........... 318/567 |
| 2003/0085682 | A1 * | 5/2003 | Hussein ....................... 318/599 |

* cited by examiner

*Primary Examiner*—A. Farah
(74) *Attorney, Agent, or Firm*—Wood, Phillips, Katz, Clark & Mortimer (57) ABSTRACT

The invention relates to an electromotive actuator and a corresponding circuit in order to replace a pneumatical actuator system in a simple manner by an electric system.

14 Claims, 5 Drawing Sheets

CONTROLLING ELECTROMOTIVE ACTUATORS

TECHNICAL FIELD OF THE INVENTION

The present invention relates to the control of electromotive actuators.

Electromotive actuators are all mechanically moveable devices for defining quantities or positions in a technical apparatus, the actuation of which relies on electrical mechanisms. As used here, the term is not limited to actuators in feed-back controlled systems and controlled systems in a narrow sense, however, it comprises e.g. also actuators moving an apparatus part into a position or out of this position, such as closing or opening a closure.

RELATED ART

In the art, such actuators frequently are driven by pressurized fluid, preferably pneumatically. They are controlled by switching valves and corresponding pressurizing or depressurizing.

Electromotive actuators are also known. Their control is somewhat more demanding with regard to signalling technique, since the corresponding electric drive must be supplied with the necessary currents for movement and holding in a certain position, if necessary, of the actuator and the apparatus part driven thereby.

On the other hand, electromotive actuators have the advantage of reduced maintenance and do not require a dedicated pressure fluid supply in cases in which this is not given for other reasons in the respective apparatus, anyway.

SUMMARY OF THE INVENTION

The present invention has the object to provide an advantageous solution for controlling electromotive actuators.

According to the invention, a circuit for connecting an electromotive actuator to a control device is provided, said circuit being adapted to output a drive current to said actuator responsive to an input of a control signal pulse from said control device and to output a hold current to said actuator being smaller than said drive current, after completion of an electromotive movement of said actuator, wherein said circuit is adapted for connecting said actuator to a pressure fluid system control device, wherein said circuit comprises a pulse form circuit for producing a sufficiently long pulse for said movement of said actuator from a shorter control signal pulse and wherein said circuit is adapted to, responsive to said input of said control signal pulse and during said long pulse produced by said pulse form circuit, output said drive current to said actuator and switch to said hold current after switching off said drive current.

Further embodiments of the circuit are defined in the dependent claims.

The circuit according to the invention is characterized in that it can be connected to an electronic control device, especially a SPC control (stored program control) device originally adapted for pressure fluid actuators. Such pressure fluid control devices provide electric pulses for valve control, the pressure fluid actuators applied therewith (in the following, for simplicity, named as pneumatic actuators without limitation) being moved and held in the acquired position by corresponding pressures. The circuit according to the invention is adapted to output a hold current to the actuator after completion of the electromotive movement of the actuator, said hold current being smaller than the drive current required for the electromotive movement, however, being different from zero and providing a certain lasting holding force.

Thus, the invention has the advantage to only require simple control pulses for "setting" the respective actuator. The circuit according to the invention, in case of such a control signal pulse, provides for the production of the required drive current and the succeeding production of the hold current. By means of the hold current, the actuator can be held in the respective position despite of possible external forces due to mechanical shocks or gravitational forces, thus defining the position in a lasting manner. Principally, it would also be possible to mechanically lock the actuator in the desired positions, i.e. to prohibit a movement out of the position by means of a merely mechanical solution. However, this requires an additional effort for mechanical constructions and thus additional maintenance and further risks of interferences. The circuit according to the invention thus shall provide an adequate hold current in at least one of the positions to be acquired, preferably in all positions to be acquired.

A further advantage of using electromotive actuators instead of pressure fluid driven actuators is that it is easy to produce equal forces in the different movement directions. Normally, this is not the case with hydraulic or pneumatic cylinders.

Principally, the position could be monitored by measurement and the hold current could be feed-back controlled such that this position is maintained. However, it is simpler and preferred in this invention to provide a mechanical stop in the respective position against which the actuator or the apparatus part moved thereby can be driven with the force produced by the hold current.

The circuit according to the invention preferably further comprises a pulse form circuit for producing a sufficiently long pulse for the movement of the actuator. This pulse form circuit thus serves for transforming a possibly too short control signal pulse of the control device into a longer pulse corresponding to the duration of the drive current. This pulse either is given in the form of a drive current itself or serves for controlling a respective switch for switching the drive current.

Further, it is preferred to provide a pulse form circuit for bringing the control signal pulses to a predefined pulse potential, especially for reducing absolutely too high potentials of the pulses to a predefined potential. This serves for producing a predefined control pulse for drive current switches or for the definition of the value of the drive current. It is preferred to combine both pulse form circuits.

Further, a bistable relay circuit can be provided, the two stable states of which correspond to a movement direction of the actuator, respectively, and which circuit is switched over responsive to control signal pulses. Therein, the polarity of the control signal pulses or the identity of the receiving input can correspond to the corresponding directions of movement and states of the bistable relay circuit. The chosen direction of movement is maintained and defined therein in a stable manner, especially in case of supply interruptions.

Especially for safety relevant applications being further discussed in the following, a latch circuit is preferred. This latch circuit serves for latching a hold state of the actuator in a defined acquired position, i.e. to make it independent from a further input of a possible control pulse. This means that the corresponding hold state, namely the acquired position of the actuator, is maintained as long as the latch circuit releases the latch state. During the latch state, the actuator does not react on control signal pulses which would otherwise cause a drive current and thus a movement.

Further, the circuit according to the invention comprises feed-back control circuits for the drive current and the hold current. It can further comprise a filter circuit, such as a low pass circuit, for filtering interference pulses at the control signal inputs. A further advantageous embodiment comprises an over current monitor means at the motor supply which switches off the motor in case of too large supply currents.

Frequently, electromotive actuators are not used in a single manner but as a multiplicity in a technical apparatus. Naturally, they can be controlled in a parallel manner by common circuits, therein, as long as the movements can be synchronous. Frequently, however, a multiplicity of circuits according to the invention is necessary. Hereto, the invention provides a further embodiment in which the circuits are provided in separate module casings. The module casings have electrical plug-and-socket connection elements and can be push-connected onto module connector portions in a distribution board. The distribution board itself is connected to the control and receives and distributes the respective control signals. Further, the supply of the circuits is done over the distribution board. The modules respectively comprise connection elements for supply lines to the actuators. In summary, with the circuits according to the invention in their module casings, a central signal and power supply as well as mounting of the circuits can be achieved which is very similar to a pneumatic distribution. This solution is especially practical in a retrofitting or exchanging of actuators and/or circuits due to their modular construction.

Besides the already described set of a multiplicity of circuits, the invention also relates to a set of an electromotive actuator and a circuit as described, wherein of course also a multiplicity of actuators together with one or also a multiplicity of circuits can be provided. The actuator preferred for the invention is a connecting rod actuator (push-pull-rod actuator) preferably having features explained in the following and exemplified in the embodiment. Precautionarily it is noted that the applicant reserves the right of filing patent claims with features of the actuator as such and without the features of the circuit. The physical features of the actuator thus shall also be disclosed as being independent from the rest of the invention.

Preferably, the actuator comprises a drive shaft of an electric rotation motor (whereas the electromotive drive could naturally also be a linear motor). This drive shaft carries a pinion meshing with a rack. This rack is either integral with the connecting rod or connected therewith such that the connecting rod is driven, finally, i.e. it is coupled to the connecting rod in some physical manner or by means of a mounting. Thus, the preferred actuator of the invention is an electromotive substitute for a pressure fluid cylinder, especially a pneumatic cylinder. Especially, the actuator according to the invention can, without further efforts, be adapted by means of the electromotive drive such that equal forces are achieved in both movement directions of the connecting rod. Further, the connecting rod can be rotation-locked without special measures, whereas a rotation-locking of pressure fluid cylinders is somewhat more complicated.

The movements of the connecting rod and the rack, respectively, are electrically monitored by means of respective end position switches and an intermediate position switch, preferably. Therein, the intermediate position switch is adjustable in its position. The two end position switches need not be provided simultaneously but can also be optional. Especially, depending on the orientation of the respective actuator, either the one or the other end position switch can be mounted at the respective mounting location in the actuator and the distance of movement between the respective end position and the intermediate position of the intermediate position switch can be used for the actuator. Then, one and the same actuator construction can be applied for different orientations (left and right) and consequently be equipped with the one or the other switch. If switch costs are not important, both end position switches can be mounted, naturally, whereas depending on the application, possibly only one of both end position switches will be connected.

The intermediate position switch is a Reed switch in an advantageous embodiment, namely a contact to be closed by means of a magnet. Therein, a rod being guided in relation to the actuator casing in a shiftable manner and carrying the contact or the magnet can be provided for adjusting the intermediate position of the actuator.

The already mentioned mechanical stops for the positions to be acquired can be implemented by respective mechanical end stops for the end positions in the actuator casing, preferably, namely in the form of being independent from the end position switches so that these are not applied with the holding force. The intermediate position stop is provided outside of the actuator casing, preferably, such as in the form of a stop for the apparatus part to be moved. Especially, the desired apparatus part position can mechanically be adjusted by this intermediate position stop and the mentioned adjustable Reed switch can be re-adjusted such that it electrically detects exactly this intermediate position.

The actuator preferably comprises a grounded and closed metal casing in order to avoid interference by electromagnetic pulses. This applies especially for the preferred applications yet to be explained in the following.

Further, the invention refers to an actuator control system comprising a control device for controlling the actuator via the circuit besides the already mentioned set of at least one actuator and at least one circuit of the invention. Additionally, the invention relates to a preferred application being a laser apparatus in which such an actuator control system is incorporated and the corresponding actuator or actuators position optical elements of the laser apparatus. Especially, the invention relates to laser apparatus for treatment of defective vision of the human eye being known as such and well-documented in the prior art. In such apparatus, optical elements, e.g. shutters, shades, closures and the like must be positioned safely. Since these apparatus are often used in clinics or doctors' practices outside of the infrastructure of a workshop, maintenance aspects are important so that it is very attractive to replace pneumatic systems by electric systems. However, especially here, pneumatic actuators have been used so far so that the invention is of special interest. Also here, the invention can be used for retrofitting of existing laser apparatus when they must be examined by a technician for repairing or maintaining, anyway.

The invention will be explained in further details with regard to a preferred embodiment, wherein single features disclosed can also be relevant for the invention in other combinations.

DESCRIPTION OF A PREFERRED EMBODIMENT

Figure 1:
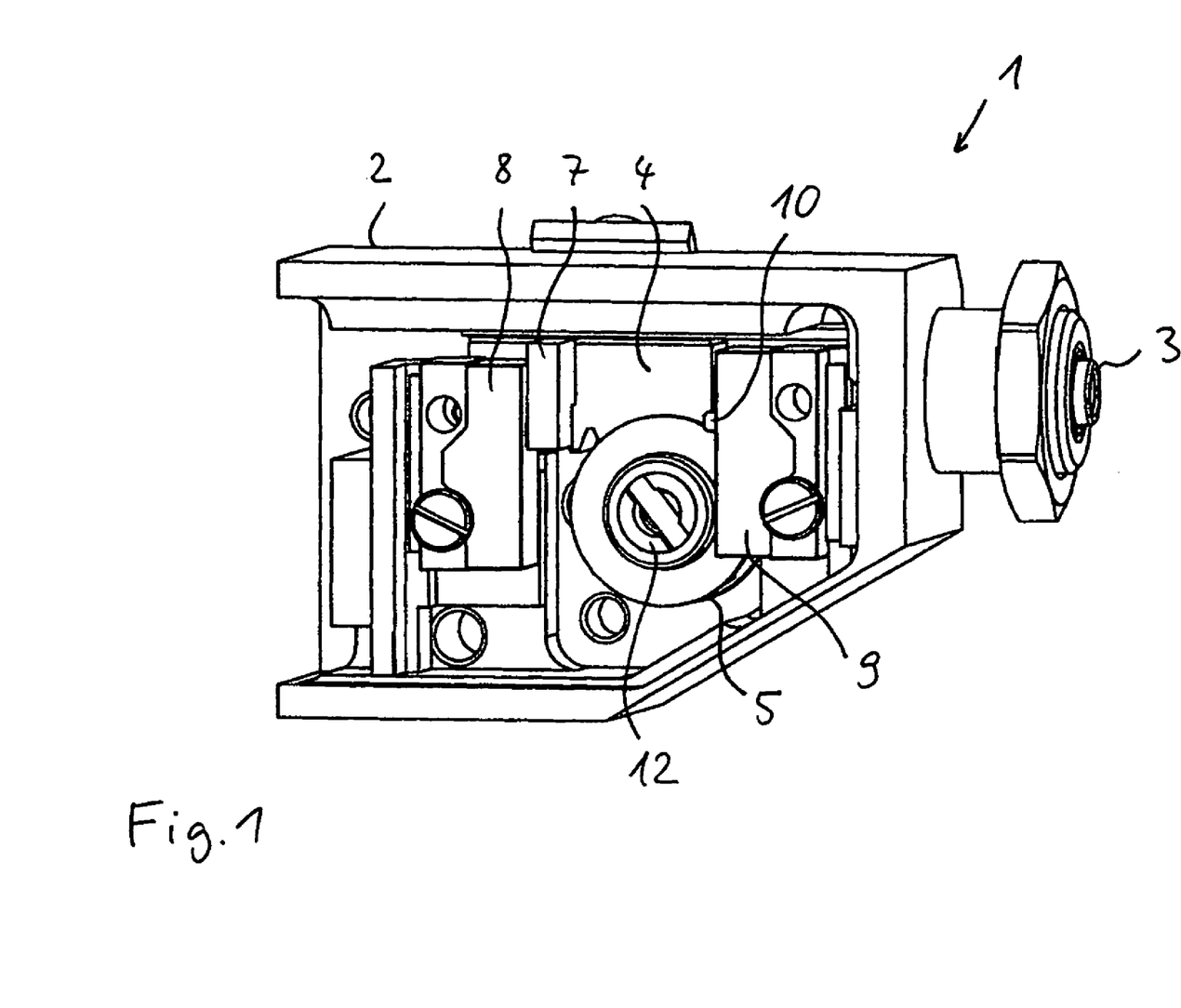
FIG. 1 shows a right front perspective view of an actuator according to the invention.
Figure 2:
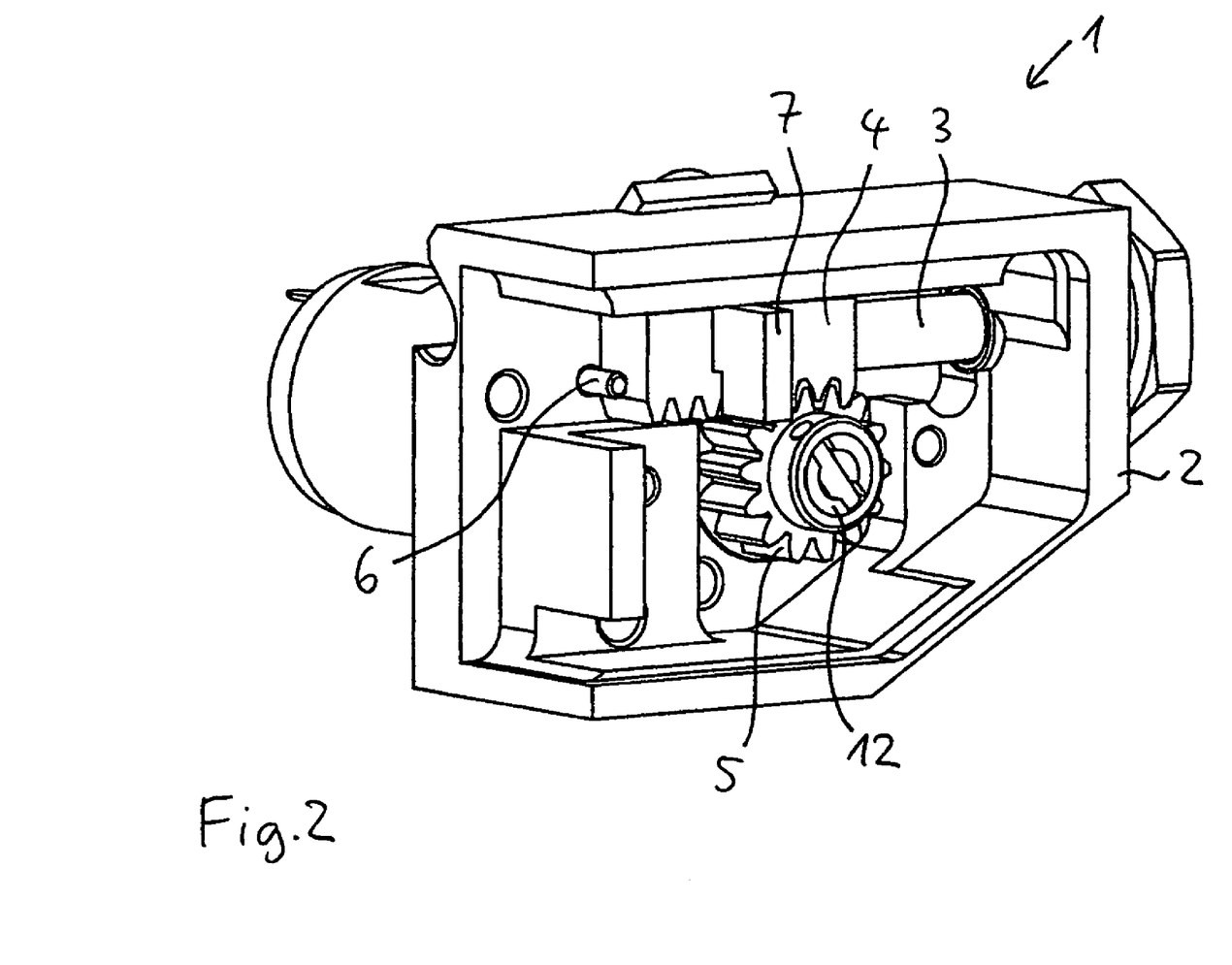
FIG. 2 shows a left front perspective view of the actuator according to the invention.

FIG. 1 shows an actuator according to the invention being a connecting rod or push-pull rod element, in a right front perspective. 2 designate an aluminium casing, the front and left closure part of which being omitted for clarity reasons. In application, casing 2 is completely closed and grounded to be an electromagnetic shielding. On the right side, a connecting rod 3 projects from casing 2 and can be reciprocated linearly by the actuator 1. Connecting rod 3 has a threading (a nut being shown) which is a simple cylinder in the drawing and serves for mounting on an apparatus part to be moved. A part of the connecting rod within casing 2 is implemented as a rack 4 and meshes with a pinion 5. Pinion 5 is obscured in FIG. 1 by a circular front cover plate (reference numeral 5 referring to the pinion). However, it is clearly depicted in FIG. 2 showing the actuator 1 in a left front view, since the circular cover plate is omitted there. The cover plate serves for guiding rack 4 on pinion 5 as a further cover plate on the other side of pinion 5. FIG. 2 further shows that connecting rod 3 is implemented as rack 4 in the region of a possible overlap with pinion 5 and is cylindrical in its rest.

Both FIGS. 1 and 2 show connecting rod 3 in its completely retracted position wherein rack 4 abuts against a stop pin 6 visible in FIG. 2. Simultaneously, a switching projection 7 on rack 4 pushes against an end position switch 8, as shown in figure 1. End position switch 8 is omitted in FIG. 2 as well as an opposing end position switch 9. The contact between rack 4 and stop pin 6 prohibits an application of the holding force of connecting rod 3 on end position switch 8. The same applies for a not shown opposing position in which connecting rod 3 abuts against a right portion of casing 2 depicted in FIG. 2. In this position, switching projection 7 would switch end position switch 9, the actuation key of which is designated with 10 in FIG. 1.

It is clear that the end position switches can be mounted at correspondingly formed mounting locations with only a single respective mounting screw. In a practical application, one of both end position switches 8 and 9 can be provided and the other one can either be physically omitted or not connected.

On the upper side of rack 4, a sliding plate is arranged which is visible in part in figure 1 and enables rack 4 to slide on the upper side of casing 2 with low friction. Connecting rod 3 further slides through the corresponding boring in casing 2. Connecting rod 3 and rack 4 thus are held and guided by the sliding plate, the boring, pinion 5 and both cover plates of pinion 5.

Figure 3:
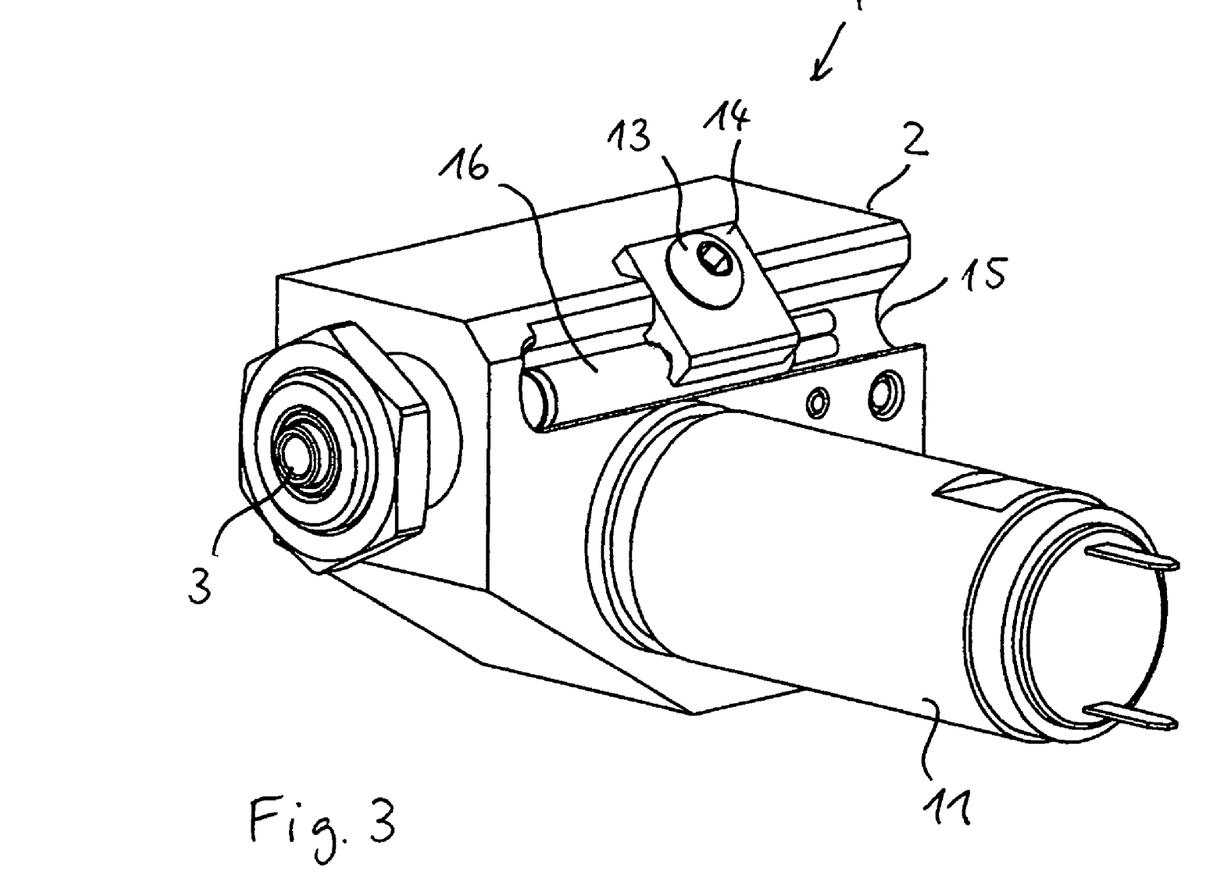
FIG. 3 shows a back view of the actuator according to the invention from a right upper perspective.

FIG. 3 shows the same actuator 1 from its backside together with a drive motor 11 not shown in FIGS. 1 and 2. Drive motor 11 has a drive shaft 12 depicted in FIGS. 1 and 2 inside pinion 5 and being simply inserted into pinion 5. Therein, a transverse rod of pinion 5 engages in respective grooves of drive shaft 12 in order to produce a form-fitting for torque transmission.

FIG. 3 further shows a clamp fixing means 14 to be clamped by means of a screw 13 and for clamping a rod 16 guided in a groove 15 on casing 2. FIG. 3 shows that rod 16 has electric contacts at its right end. These contacts are connected to two thin wires in the inside of rod 16 that can be contacted or closed by means of a magnetic field of an external permanent magnet in the way of a Reed switch. This permanent magnet is mounted at a, according to FIGS. 1 and 2, back portion of rack 4 in a manner not visible in the figures. Thus, if rod 16 having the Reed contact is displaced, the intermediate position is displaced in which the magnet on rack 4 closes the Reed contact in rod 16.

Figure 4:
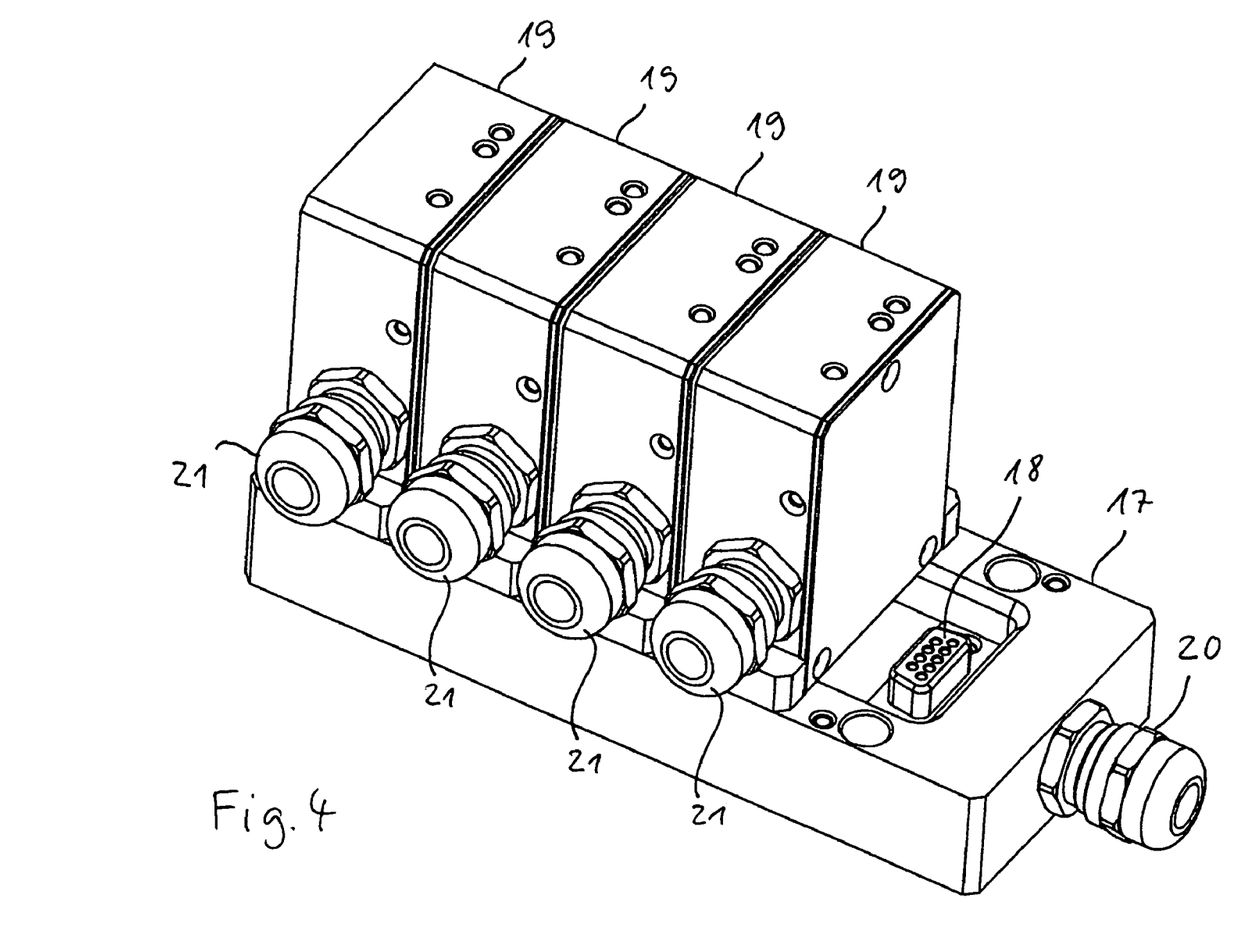
FIG. 4 shows a perspective view of a modular set of circuits according to the invention for controlling an actuator according to FIGS. 1-3, on a distribution board.

Electromotor 11 in FIG. 3 thus can linearly move an apparatus part by means of drive shaft 12, pinion 5, rack 4, connecting rod 3 and the threading thereon. Therefore, the in this case simple DC motor must be supplied with the respective currents. Hereto, circuit modules are used that are shown in FIG. 4. FIG. 4 shows four circuit modules 19 which are inserted on a distribution board 17 having sockets 18, the circuit modules respectively comprising a control circuit for electromotor 11 being described in more detail with respect to FIG. 5. A wire connection which is shown here only in form of an exit 20 leads from distribution board 17 to a SPC pneumatic control device. The different poles of this wire connection are connected to sockets 18 in an according to FIG. 4 lower portion of the distribution board such that the individual modules are connected with the SPC control device after insertion. A cable connection which is again only shown in the form of an exit 21, respectively leads from modules 19 to electromotor 11 as shown in FIG. 3. FIG. 4 also shows an insertable control circuit module system for controlling actuators 1 according to FIGS. 1-3.

Figure 5:
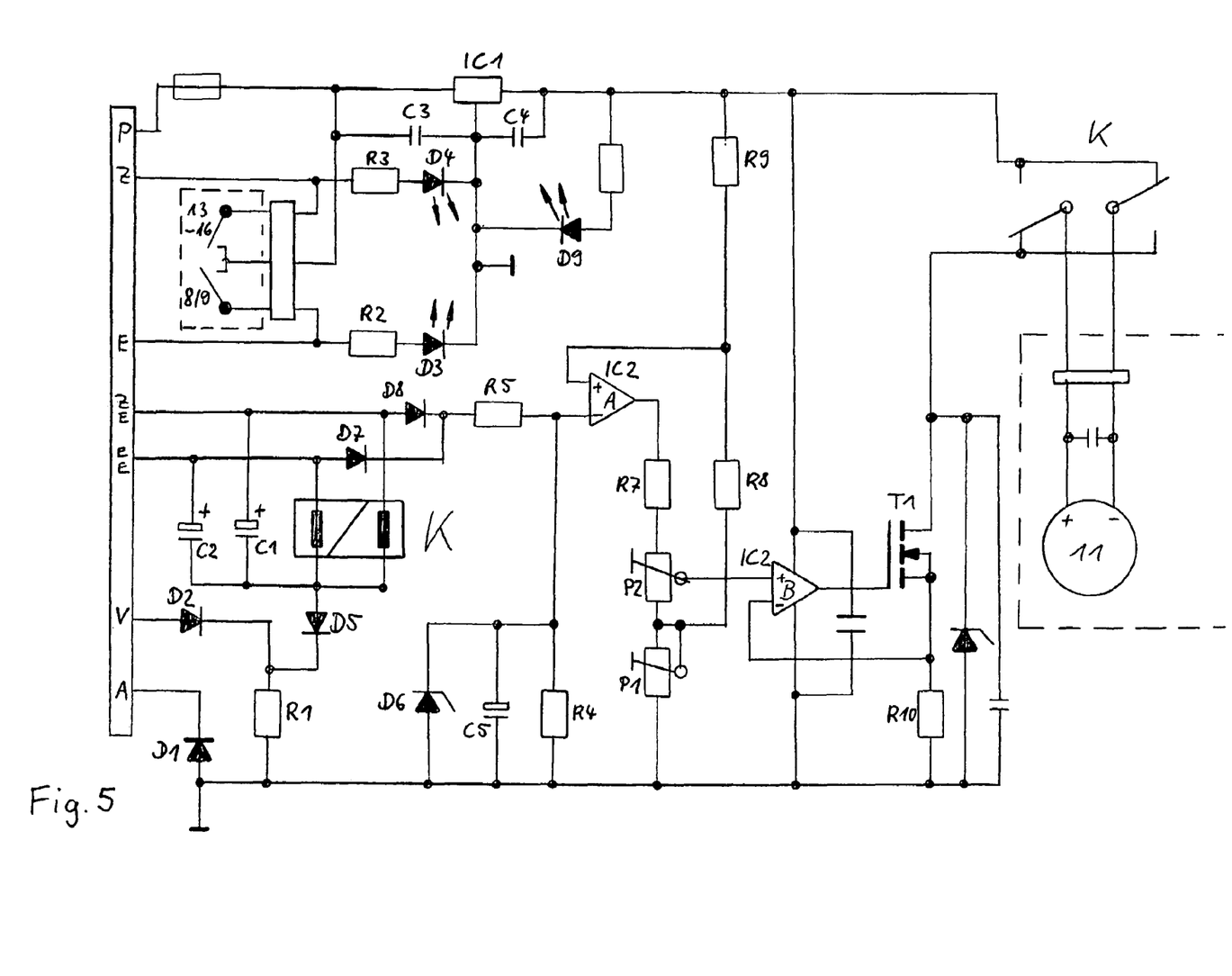
FIG. 5 shows a circuit diagram of a circuit according to the invention in one of the modules of FIG. 4.

The circuit contained in modules 19 is shown in FIG. 5, wherein the right portion shows electromotor 11 and the left portion shows a counterpart 22 (plug) for socket 18 in FIG. 4. This plug 22 comprises from top to bottom a power supply potential connection P having +24 V power supply potential related to ground (at the bottom of FIG. 5), a signal output Z for the contact of Reed switch 16 in FIG. 3, a signal output E for the end position contact of end position switch 8 or 9 in FIG. 1, an intermediate position control pulse input ZE, an end position control pulse input EE, a latch signal input V and finally a ground connection M.

Power supply potential P supplies a power supply potential branch drawn horizontally in the upper portion of FIG. 5, over a common fast SMD fuse, an integrated voltage feed-back control circuit IC1 being drawn in said power supply potential branch. Two external capacitors C3 and C4 short-circuit high-frequency noise.

Z connection and E connection are connected to power supply potential P via respective resistors R3 and R2, respectively, and light-emitting diodes D3 and D4 respectively, so that the end position and the intermediate position can be displayed optically. A further light-emitting diode D9 is connected between power supply potential P and ground and displays the presence of the power supply potential.

Therein, Z connection and E connection are signal outputs for outputting a respective signal to the SPC control. In FIG. 5, also the corresponding switches 8, 9 and 16 are depicted symbolically, which are connected to the circuit via a plug-and-socket connection which is only roughly sketched.

Control pulse input ZE and EE respectively switch over a bistable relay circuit K and are further connected to an operation amplifier A of an IC with reference IC2 via diodes D8 and D7, respectively. Capacitors C1 and C2 are connected to relay circuit K and short-circuit high-frequency noise. Operation amplifier IC2-A produces an output signal by comparing this input with a reference potential produced by a voltage divider circuit R8, R9 and outputs the output signal to a voltage divider circuit of resistor R7 and to adjustable resistors P2 and P1 (potentiometer). The shiftable tap of adjustable resistor P2 is connected to an input of the second operation amplifier B of IC2, and the shiftable tap of second adjustable resistor P1 is connected to voltage divider circuit R8, R9.

If operation amplifier IC2-A produces an output near to ground potential, i.e. "low" output, the potential of the tap between P1 and P2 is determined by the voltage division ratio between P1 (adjustable) and R8 and R9. Since R7 has a much higher resistance than P2 and since P2 again has a much higher resistance than P1 (approximately 100 kΩ in relation to 10 kΩ in relation to 1 kΩ), the tap at P2 substantially corresponds to this potential, i.e. substantially is determined by the adjustment of P1. This corresponds to a hold current adjustment.

If, however, the output of operation amplifier IC2-A switches to "high", i.e. delivers approximately 19 V, some Volt are added to this potential between P1 and P2 over the tapped path along P2, e.g. 1 V or 1,5 V depending on the adjustment of P2. Thus, in this case, a supplement defined by the adjustment of P2 is added to the hold current determined by the adjustment of P1, and the drive current is defined correspondingly. Since P1 has a much lower resistance than the series connection of P2 and R7, the potential between P1 and P2 itself is almost not influenced by the output of operation amplifier IC2-A.

Operation amplifier IC2-B together with the target input produced in the described manner serves as a feed-back control circuit for the motor current. The motor current is measured over a measurement resistor R10 and flows through the controllable path of a transistor T1 in motor 11. In the right portion of FIG. 5 a switch part of already mentioned bistable relay K is shown above motor 11, the actuation solenoids of which are shown more on the left side in FIG. 5 (being connected to inputs ZE and EE). It is clear that bistable relay K changes the polarity with which motor 11 is connected on the one hand to the power supply potential and on the other hand to ground wire transistor T1. Setting bistable relay k thus determines the sense of rotation of the motor, namely dependent from whether the control pulse arrives via input ZE or via input EE. Further, both control pulses via ZE and control pulses via EE cause, by operation amplifier IC2-A, an adjustment of the drive current target value at operation amplifier IC2-B instead of the otherwise present hold current target value.

The control pulses are limited in their voltage on the one hand by a Zener diode D6 between R5 and the input of operation amplifier IC2-A so that (inadvertent) over-voltages of the control pulses are not harmful and especially a change of the current target values can be avoided. On the other hand, via resistor R5 a capacitor C5 can be charged with a certain constant time parameter as a result of a control pulse, in order to filter high-frequency interference pulses or noise by the low pass effect of the filter circuit of R5 and C5. If C5 is charged by a control pulse, C5 is discharged after the relatively short control pulse to ground via a resistor R4 so that the pulse applied to operation amplifier IC2-A is broadened in relation to the time length of the original control pulse. The length of the thus produced pulse is sufficient for a complete movement of connecting rod 3 and the apparatus part driven thereby from an end position to an intermediate position or vice versa. Circuit pulse R4, R5, C5, and D6 thus constitute a pulse form circuit for high-frequency filtering, pulse prolongation, and pulse height limitation of the control pulse.

Finally, via input V and a diode D2, a latch signal can set the potential at the lower connection of the actuation solenoids of bistable relay K to a high value (upper connection of resistor R1) and thus prevent a substantial current through the actuation solenoids. A control pulse arriving at ZE or EE during presence of the latch signal thus does not revert the rotation direction of motor 11 but only causes a short-term increase of the hold current to the level of a drive current. This is not detrimental since the reduction to the hold current has only thermal reason, anyway (protection of transistor T1), so that short-term increases are not important. However, it is guaranteed that connecting rod 3 is not changed in its position because it can only press against a respective stop with an increased force but not retract therefrom in opposite direction.

In conclusion, the circuit in FIG. 5 serves for prolongating simple short pneumatic control pulses of the SPC control device in an adequate manner, define them in their level and transform them into a drive current for a sufficient time period, wherein the circuit switches over to a hold current after switching off the drive current and thus holds the electromotive actuator 1 in the acquired position with a holding force. Therein, the circuit is arranged in a relatively simple and cost-effective manner and can be mounted in a modular manner and similarly to a pneumatic distribution as shown in FIG. 4. Thus, the invention offers the option to replace a pneumatic actuator system in an apparatus, especially in a laser apparatus for defective vision control, by an electric actuator system without the necessity to change the SPC control device and its program. In consequence, only relatively small amendments must be made in the production of the laser apparatus, and especially already used apparatus are retrofittable.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

The invention claimed is:

1. A circuit for connecting an electromotive actuator to a control device,
said circuit being adapted to output a drive current to said actuator responsive to an input of a control signal pulse from said control device
and to output a hold current to said actuator being smaller than said drive current, after completion of an electromotive movement of said actuator,
wherein said circuit is adapted for connecting said actuator to a pressure fluid system control device,
wherein said circuit comprises a pulse form circuit for producing a sufficiently long pulse for said movement of said actuator from a shorter control signal pulse and wherein said circuit is adapted to, responsive to said input of said control signal pulse and during said long pulse produced by said pulse form circuit, output said drive current to said actuator and switch to said hold current after switching off said drive current.

2. A circuit according to claim 1 comprising a pulse form circuit for producing a predetermined pulse potential from a control pulse having an absolutely larger potential.

3. A circuit according to claim 1 comprising a bistable relay circuit for defining a movement direction of said actuator depending on a control pulse.

4. A circuit according to claim 1 comprising a latch circuit for latching a hold mode of said actuator independent from an input of a possible control pulse.

5. A set of a multiplicity of circuits according to claim 1 being mounted in separate module casings and inserted on a module connector portion in a distribution board, said distribution board being adapted for receiving and distributing control signals and for supplying said circuits, respective actuator supply lines being connectable to said module casings.

6. A set of an electromotive actuator and at least one circuit according to claim 1 and set comprising circuits according to claim 5.

7. A set according to claim 6 wherein said at least one actuator is a connecting rod actuator.

8. A set according to claim 7 wherein said connecting rod actuator comprises an electromotive drive, a pinion mounted thereon via a drive shaft, and a rack drivable by said pinion and coupled to the connecting rod.

9. A set according to claim 7 comprising an end position switch for detecting an end position of said connecting rod and an intermediate position switch adjustable in its position for detecting an intermediate position, a further end position switch being mountable for detecting the other end position of said movement of said connecting rod.

10. A set according to claim 9 wherein said intermediate position switch is a Reed switch comprising a rod guided in a shiftable manner for adjusting said intermediate position.

11. A set according to claim 9 wherein said at least one actuator comprises respective mechanical end stops for said end positions defining said end positions of said movement of said actuator independent from said end position switches.

12. An actuator control system comprising a control device and a set according to claim 6.

13. A laser apparatus comprising an actuator control system according to claim 12, in which a plurality of said actuators are adapted to position optical elements.

14. A laser apparatus according to claim 13 for defective vision treatment of the human eye.

* * * * *

UNITED STATES PATENT AND TRADEMARK OFFICE
CERTIFICATE OF CORRECTION

PATENT NO.        : 7,316,382 B2
APPLICATION NO.   : 10/856134
DATED             : January 8, 2008
INVENTOR(S)       : Erich Kratzmaier It is certified that error appears in the above-identified patent and that said Letters Patent is hereby corrected as shown below:

Column 9, line 8 (the first line of claim 6), "of" should be --comprising--;

Column 9, line 9 (the second line of claim 6), "comprising" should be --of--; and Column 10, line 2 (the last line of claim 9), "said movement" should be --the movement--.

Signed and Sealed this

Twenty-ninth Day of April, 2008

JON W. DUDAS
*Director of the United States Patent and Trademark Office*